(12) United States Patent
Eriksen et al.

(10) Patent No.: US 9,091,022 B2
(45) Date of Patent: Jul. 28, 2015

(54) PROCESS AND APPARATUS FOR MODIFICATION OF LIGNOCELLULOSIC MATERIALS AND PRODUCTS OF MODIFIED LIGNOCELLULOSIC MATERIALS OBTAINED BY THE PROCESS

(75) Inventors: Per Berre Eriksen, Lundby (DK); Peter Larsen, Lundby (DK); Eskild Kyhn, Copenhagen (DK)

(73) Assignee: Danish Plant Fibre Technologies Holding A/S, Copenhagen K (DK)

( * ) Notice: Subject to any disclaimer, the term of this patent is extended or adjusted under 35 U.S.C. 154(b) by 0 days.

(21) Appl. No.: 13/978,771

(22) PCT Filed: Jan. 10, 2011

(86) PCT No.: PCT/DK2011/050007
§ 371 (c)(1),
(2), (4) Date: Jul. 9, 2013

(87) PCT Pub. No.: WO2012/095108
PCT Pub. Date: Jul. 19, 2012

(65) Prior Publication Data
US 2013/0277000 A1 Oct. 24, 2013

(51) Int. Cl.
*D21C 1/04* (2006.01)
*C08H 8/00* (2010.01)

(52) U.S. Cl.
CPC ... *D21C 1/04* (2013.01); *C08H 8/00* (2013.01)

(58) Field of Classification Search
USPC ............... 536/56, 58, 63, 6, 4, 69, 70, 71, 76, 536/115, 119, 124, 127, 128; 162/63; 8/116.1, 120, 121, 129
See application file for complete search history.

(56) References Cited
U.S. PATENT DOCUMENTS 5,608,051 A * 3/1997 Nelson et al. .................... 536/76
5,777,101 A * 7/1998 Nelson et al. .................... 536/56
(Continued)

FOREIGN PATENT DOCUMENTS

| EP | 0213252 A1 | 3/1987 |
| EP | 0650998 A1 | 5/1995 |

(Continued)

OTHER PUBLICATIONS

Bertoti et al; "Effects of Acetylation in Vapor Phase and Mercerization on the Properties of Sugarcane Fibers"; Carbohydrate Polymers ; Nov. 27, 2008; pp. 20-24.

(Continued)

*Primary Examiner* — Dennis Cordray
(74) *Attorney, Agent, or Firm* — Ohlandt, Greeley, Ruggiero & Perle, L.L.P.

(57) ABSTRACT

A process and apparatus for the preparation of a modified lignocellulosic material by
treating the lignocellulosic material in a first activator zone having an atmosphere of one or more acid anhydrides in vapour form in a gas at a gauge pressure of 0-50 kPag and a temperature of 100-160° C., and then
treating the lignocellulosic material in a second reactor zone having an atmosphere of a gas at a gauge pressure of 0-50 kPag and a temperature of 120-190° C., thereafter
stripping the lignocellulosic material with steam or water in a stripper zone, and
optionally further processing.

The process is more efficient as compared with the prior art processes by providing a better access of the acid anhydrides to the sites of the reactive lignocellulosic hydroxyl groups (—OH), which are located on the internal surfaces of pores and capillary channels in the lignocellulose. Furthermore, the apparatus is relatively simple. This makes the inventive process and apparatus suitable for a cost-efficient preparation of modified lignocellulosic fibre in industrial scale.

15 Claims, 2 Drawing Sheets

(56) References Cited

U.S. PATENT DOCUMENTS

| | | | |
|---|---|---|---|
| 5,821,359 A * | 10/1998 | Nelson et al. | 536/56 |
| 8,729,253 B2 * | 5/2014 | Buchanan et al. | 536/64 |
| 2005/0192434 A1 * | 9/2005 | Buchanan et al. | 536/32 |
| 2010/0331531 A1 * | 12/2010 | Mykytka | 530/501 |
| 2011/0091736 A1 * | 4/2011 | Felty et al. | 428/541 |

FOREIGN PATENT DOCUMENTS

| | | | |
|---|---|---|---|
| EP | 2289980 A1 | 3/2011 | |
| GB | 2271570 A | 4/1994 | |
| WO | 9619526 A1 | 6/1996 | |

OTHER PUBLICATIONS

Jebrane et al; "A Comparative Study on the Acetylation of Wood by Reaction With Vinyl Acetate and Acetic Anhydride"; Carbohydrate Polymers; Jul. 16, 2010; pp. 339-345.

International Search Report dated Aug. 19, 2011 for PCT application No. PCT/DK2011/050007.

Written Opinion dated Aug. 19, 2011 for PCT application No. PCT/DK2011/050007.

* cited by examiner

PROCESS AND APPARATUS FOR MODIFICATION OF LIGNOCELLULOSIC MATERIALS AND PRODUCTS OF MODIFIED LIGNOCELLULOSIC MATERIALS OBTAINED BY THE PROCESS

TECHNICAL FIELD

The present invention relates to a process and apparatus for the preparation of a modified lignocellulosic material by contacting and reacting a lignocellulosic material with an acid anhydride containing modification agent and stripping the modified lignocellulosic material to remove excess of modification agent and by-products, The terms "lignocellulose" and "lignocellulosic materials" are recognized by those skilled in the areas of natural product and plant sciences. These terms refer to any of several closely related substances constituting the essential part of woody cell walls of plants comprising cellulose closely associated with lignin and hemicellulose. The carbohydrate polymers of lignocellulose (cellulose and hemicellulose) are tightly bound to the lignin, by hydrogen and covalent bonds.

Examples of plant materials having a great potential as a source of lignocellulosic materials are wood, including soft and hard wood, flax, hemp, jute, coconuts, cereal grasses and straws. These materials are characterized and known to be extremely rich in hydroxyl groups. The hydroxyl groups are reactive functional groups, which are readily chemically modified with such chemical species, which are known to react with hydroxyl groups. Thus, the hydroxyl groups are readily esterified with mono- or dicarboxylic anhydrides or combinations thereof, provided the anhydrides get easy access to the hydroxyl groups.

In the present specification and in the claims pressures are given as gauge pressure with "gauge" or "g" appended, "kPag" or as absolute pressures stated with "absolute" or a suffix of "a", for example "kPaa"

BACKGROUND

It is known to modify lignocellulose materials by acetylation to improve the dimensional stability of the obtained products.

U.S. Pat. No. 4,804,384 (Rowel et al.) discloses a method for modification of lignocellulosic materials by a catalyst-free acetylation by contacting the lignocellulosic material in the form of veneer, chips, flakes, fibres or particles with a liquid reactant of acetic anhydride and acetic acid; heating the reactant-contacted lignocellulosic material at a temperature of up to 120° C. for 1 to 5 hours; and, removing unreacted acetic anhydride and acetic acid from the resulting acetylated lignocellulosic material. The liquid reactant consists essentially of acetic anhydride and 0-55 vol % acetic acid, the preferred range being 10 to 30 vol %. The contact with the liquid reactant is carried out by simple dipping. Rowel does not teach to avoid contact with ambient moisture and oxygen. The unreacted acetic anhydride and acetic acid can be recovered and added back to the reactant bath until the concentration of acetic acid exceeds about 30 vol %.

EP 0650998 (Nelson et al. I) discloses a process for the acetylation of lignocellulosic fibres. The fibres are contacted with an acetylating agent comprising acetic anhydride at a temperature from 70 to 140° C. Then the acetylated fibres are contacted with a superheated chemical agent comprising acetic acid and/or anhydride at a temperature above 140° C. for removal of residual acetic acid or acetic anhydride content to below 10% by weight.

The process involves compaction of the fibres with a plug-screw feeder to reduce the permeability of the fibre to gas flow. The compacted fibres are dispersed and fed into a nitrogen purged first reactor after which a preheated acetylating agent of 10% by weight acetic acid and 90% by weight acetic anhydride is injected. The first reactor is heated at 120° C., and this temperature is maintained during the exothermic acetylating with vaporisation acetylating agent containing 70% by weight acetic anhydride, which is recovered and recycled.

The acetylated fibre emerging from the first reactor contains about 40% by weight liquid. This fibre is re-compacted in a further plug-screw feeder, and then dispersed and treated with a superheated vapour of acetic anhydride optionally containing some acetic acid from recycled streams at about 190° C.

The fibre so treated is entrained in the superheated vapour stream to a circulation stripper, where the chemicals adsorbed or occluded in the fibre are evaporated. The hot fibre entrained in the overheads from the stripper is recovered in a cyclone. After a further stripping in a steam stripper, in which any residual acetic anhydride in the fibre is hydrolysed to acetic acid and the acetic acid is stripped out, the treated fibre is recovered from the overhead by means of a cyclone.

Based on experiments made by the present inventors, it was found that the fibre treated in the plug-screw feeders as suggested in EP 0650998 (Nelson et al. I) is cut down to undesirable small particle sizes. Thus by preparation of fibre for filtration the obtained fibre had a length of about 1 mm, which is undesirably short. Moreover, the obtained fibre was far from being without unpleasant odours. Furthermore, the process is too complex and expensive for a commercial process at large scale.

WO 9523168 (Nelson et al. II) discloses a similar process for the acetylation of lignocellulosic materials using a heated inert gas in the first stripper. The remaining amount of acetic acid is stated to be below 0.5% by weight.

WO 9619526 (Nelson et al. III) discloses a further development of the above two processes using a superheated acetylating agent comprising at least 20% w/w acetic anhydride at a temperature of 140-220° C. The fibre is fed with a star feeder to a narrow chamber, wherein oxygen is displaced by purging with nitrogen followed by spraying with a mist of acetic anhydride. To avoid back flow of acetic anhydride the chamber is maintained at a pressure slightly below atmospheric. From the chamber the fibre is moved to an acetylation reactor, wherein it is treated with the superheated acetic anhydride. According to WO 9619526 (Nelson et al. III) this reactor is also a steam jacketed circulation stripper, where the chemicals adsorbed or occluded in the acetylated fibre are evaporated. As in the above mentioned processes, the acetylated fibre is recovered in a cyclone and stripped once more with steam and recovered in a second cyclone. Several systems for recovering and recycling the acetylating agent are involved in the process, which indicates that the agent at several points will contain more that 5% by weight of acetic acid.

WO 9409057 (Rogers et al.) discloses a reaction of lignocellulosic material with acetic anhydride vapour. The reaction is carried out in the absence of any co-solvent or added catalyst and without the need for distillation/rectification. Heated, partially dried or dry lignocellulosic material is treated with acetic anhydride vapour. The material is reacted and dried with or without gas flow. Acetic acid is only removed and further treated with ketene for re-vaporization. The process is described without essential technical features.

Thus, inter alia, WO 9409057 (Rogers et al.) is silent about limits for acceptable amounts of acetic acid in the anhydride vapour.

U.S. Pat. No. 7,413,662 (Eriksen et al.) discloses a modified sorptive lignocellulosic fibre material with hydroxyl groups on the lignocellulosic fibres doubly modified by esterification with a combination of monocarboxylic and dicarboxylic acid ester groups. The esterification can be made with an aliphatic monocarboxylic anhydride and a cyclic dicarboxylic anhydride for example with acetic anhydride and maleic anhydride. The sorptive fibre material is effective for the removal of oils and other contaminants including heavy metals from a fluid such as contaminated water by a combined sorption of hydrophobic contaminants and ion exchange.

U.S. Pat. No. 7,413,662, belonging to the present applicant, discloses the preparation of the modified sorptive lignocellulosic fibre material in laboratory scale using the maleic acid in a solvent. In order to prepare this fibre on commercial basis in large scale it was necessary to find a suitable process. Based on the above mentioned U.S. Pat. No. 4,804,384 (Rowel et al.) and the further development by Nelson et al. (EP 0650998, WO 9523168 and WO 9619526), experiments have been carried out in pilot plan scale unsuccessfully due to several problems. Thus a severe emission occurred from the reactor feeding. The pressure came out of control and rose to about 200 kPag or more (≈300 kPaa (absolute) or above). The fibre was defibrated to an undesired small particle size. The chemicals were not removed sufficiently and the resulting fibre had an unpleasant odour. Moreover, the esterification was not efficient leaving a larger portion of the —OH groups in the lignocellulose non-esterified.

It appears that there is still a need for a suitable process and apparatus for the preparation of esterified lignocellulosic materials which meets the requirements of
efficient and controlled migration of the esterification agent and its access to the reactive —OH groups,
efficient and controlled esterification reaction,
efficient and controlled removal of excess of the esterification agent and by-products,
commercially acceptable costs, and
environmentally sound.

DISCLOSURE OF THE INVENTION

The aspect of the invention is a process for the preparation of a modified lignocellulosic material by contacting and reacting a lignocellulosic material with a modification agent, which contains acid anhydride, and stripping the modified lignocellulosic material to remove excess of modification agent and by-products, including the steps of
a) introduction of the lignocellulosic material into a first activator zone and treatment of the lignocellulosic material in the first activator zone having an atmosphere of the modification agent, which contains one or more acid anhydrides, in vapour form in a gas at a gauge pressure of 0-50 kPag and a temperature of 100-160° C., preferably 110-150° C.,
b) transfer of the lignocellulosic material from the first activator zone into a second reactor zone and treatment of the lignocellulosic material in the second reactor zone having an atmosphere of a gas at a gauge pressure of 0-50 kPag and a temperature of 120-190° C., preferably 130-180° C.
c) transfer of the lignocellulosic material from the second reactor zone into a stripper zone and stripping of the lignocellulosic material with steam or water in the stripper zone,
d) optionally transfer to further processing.

Preferably, the gas is an inert gas such as nitrogen ($N_2$).

In a particularly preferred embodiment, the lignocellulosic material comprises wood chips or larger wooden items. It has surprisingly be found that using chips in the inventive method leads to a particularly satisfactory result with respect to degree of modification of the material. In other words, absorption of the modification agent by the material is dramatically improved as compared to prior art methods that use defibrated material already in the activation and reaction zone. Without wishing to be bound by theory it is believed that the use of coarser material, such as wood chips, improves the access of modification agent due to an increased porosity of the overall material. The resulting product obtainable by the inventive method is thus characterised by a surprisingly high degree of modification of the lignocellulosic material.

Preferably, the lignocellulosic material comprises oversize chips, overthick chips, large accept chips and/or small accept chips.

In another embodiment, the lignocellulosic material consists of wood chips.

In another aspect, the present invention relates to a modified lignocellulosic material obtainable by the method of the present invention.

A further aspect of the invention is an apparatus for carrying out the process, the apparatus comprising
a) a closed first activator zone,
    means for introducing lignocellulosic material into the first activator zone,
    means for introducing a modification agent into the first activator zone,
    means for introducing a gas into the first activator zone,
    heating means, and
    an outlet for activated lignocellulosic material;
b) a closed second reactor zone,
    means for introducing activated lignocellulosic material into the second reactor zone,
    means for introducing a gas into the second reactor zone,
    heating means, and
    one or more outlets for removal of treated (reacted) lignocellulosic material and by-products from the second reactor zone;
c) a stripper zone,
    means for introducing reacted lignocellulosic material into the stripper zone,
    means for introducing water or steam into the stripper zone, and
    one or more outlets for removal of modified lignocellulosic material and by-products from the stripper zone.

The inventive process is more efficient compared with prior art processes by providing a better access of the acid anhydrides to the sites of the reactive hydroxyl groups (—OH), which are located on the internal surfaces of pores and capillary channels in the lignocellulose. Furthermore, the necessary equipment is relatively simple. This makes the inventive process and apparatus suitable for a cost-efficient preparation of modified lignocellulosic fibre in industrial scale.

Term "reactive hydroxyl groups" as used in the present specification and claims means hydroxyl groups, which may be esterified by a reaction with an acid anhydride.

As used herein, the term wood chips is defined as in classification method Scan-CM 40:01 of 2001 (Scandinavian Pulp, Paper and Board Testing Committee). In this method, a sample of wood chips is placed on the top screen of a stack of five screen trays and a fines tray. The screens have holes or slots of specified dimensions and the stack is kept in a reciprocating motion. After a specified time, the screening is stopped and the six classes obtained are weighed separately. The size of each class is its mass, expressed as a percentage of the total mass of all six classes. Thus, the term wood chips includes oversize chips, overthick chips, large accept chips, small accept chips and pin chips. Fines do not fall under the definition of wood chips as used herein.

As used herein, larger wooden items are wooden items that have dimensions exceeding the dimensions of wood chips such as wood veneer.

The extent of applicability of the invention appears from the following detailed description. It should, however, be understood that the detailed description, the drawings and the specific examples are merely included to illustrate the preferred embodiments, and that various alterations and modifications within the scope of protection will be obvious to persons skilled in the art on the basis of the detailed description.

BRIEF DESCRIPTION OF THE DRAWINGS

The invention is explained in detail below with reference to the drawings, in which.

Figure 1:
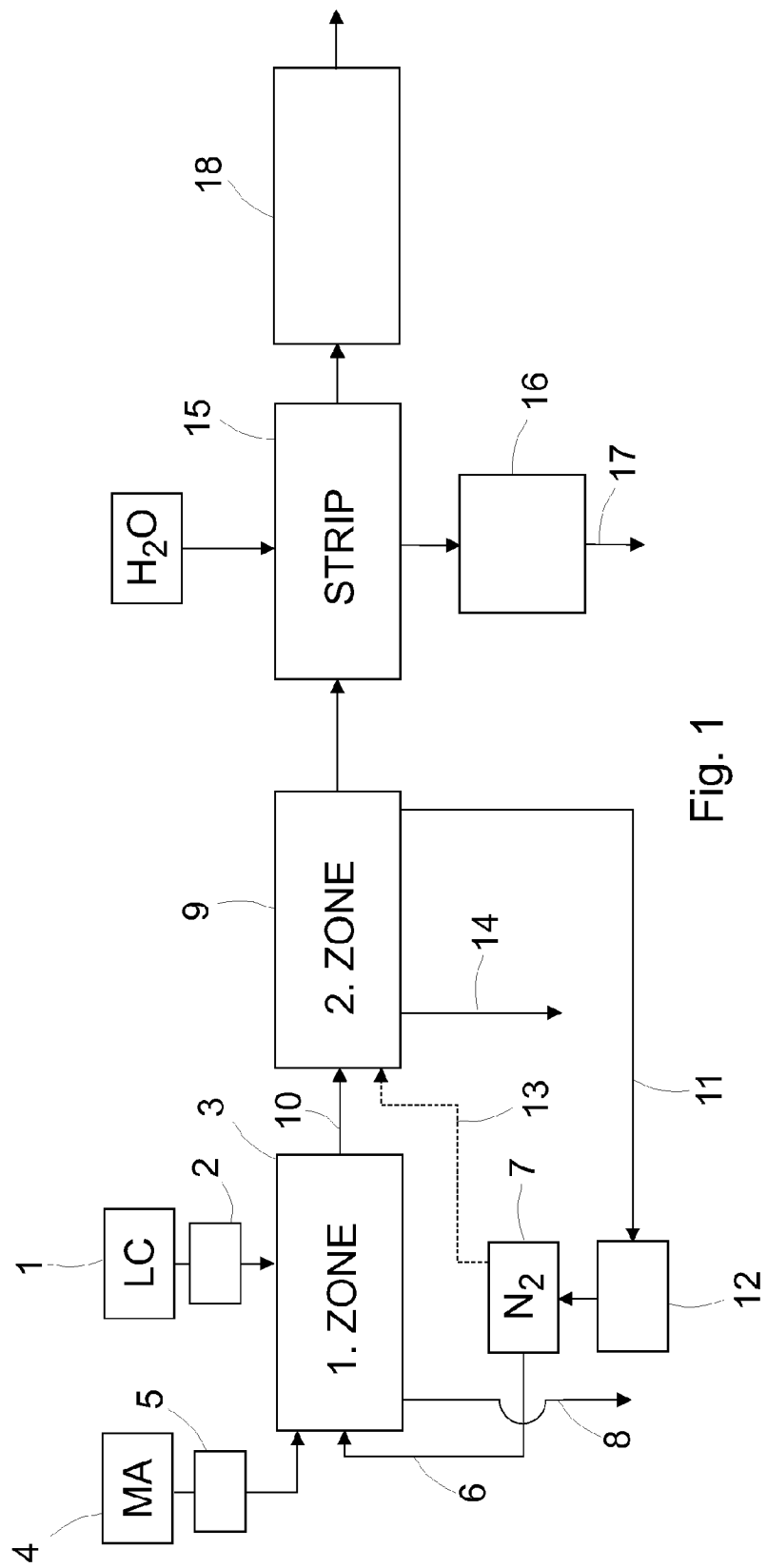
FIG. 1 is a schematic presentation of the inventive process and apparatus for modification of lignocellulosic material for preparation of medium density fibreboards (MDF), fibre for filtration, oriented strand boards (OSB) or chip boards.
Figure 2:
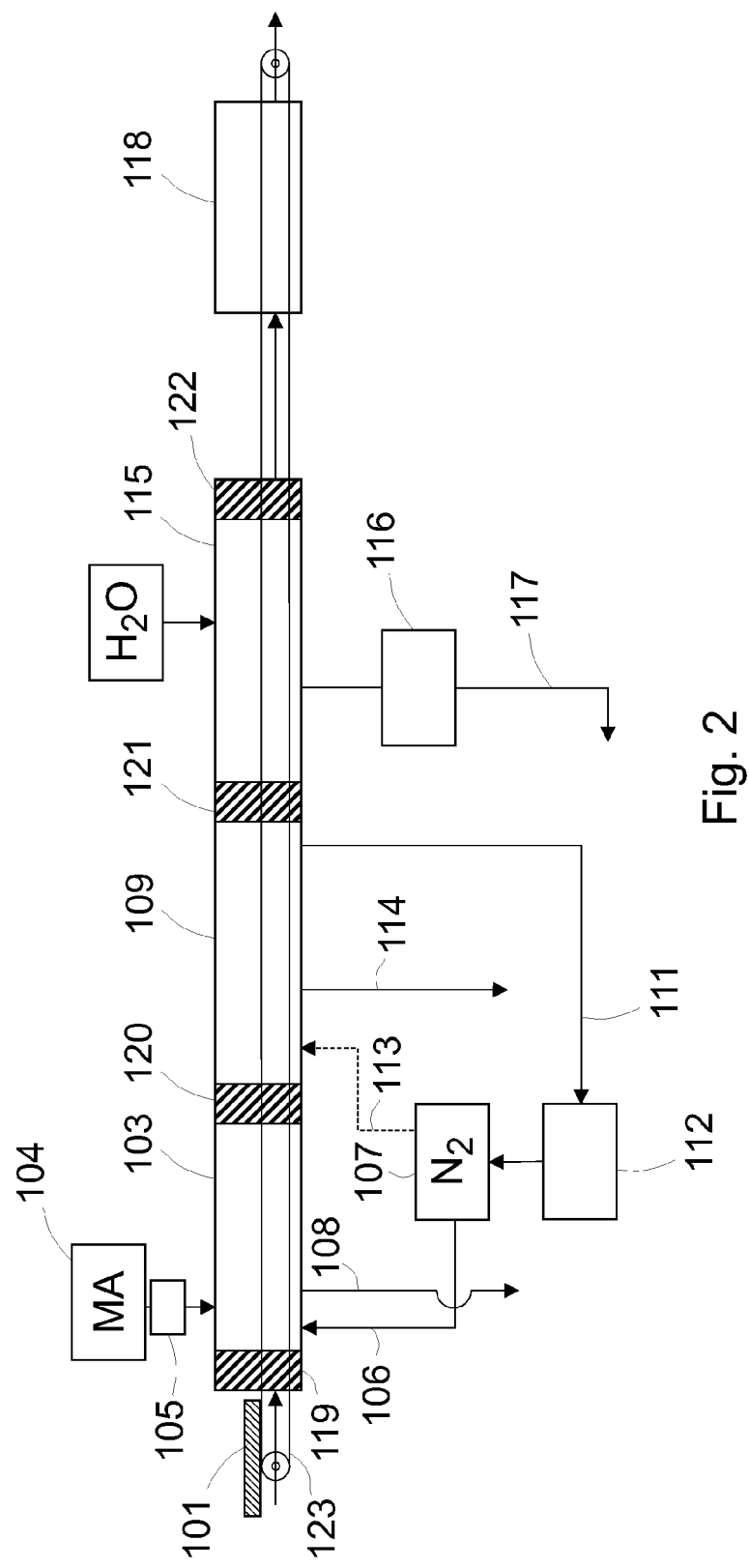
FIG. 2 is a schematic presentation of the inventive process and apparatus for modification of lignocellulosic material for preparation of modified veneers, sheets or plates.

The following abbreviations are used in FIGS. 1 and 2.
LC lignocellulosic material
1. ZONE first activator zone
MA modification agent
2. ZONE second reaction zone
STRIP stripper or stripper zone
$H_2O$ steam or water

DETAILED DESCRIPTION OF THE INVENTION

The general principles of the inventive process and apparatus will now be explained with reference to FIG. 1, which shows the modification of lignocellulosic material followed by processing to medium density fibreboards (MDF), fibre for filtration, oriented strand boards (OSB) or chip boards. Flakes and/or chips of lignocellulosic material LC are fed from a reservoir 1, for example a hopper or batch tank, by means of a feeding device 2, for example a rotary valve or a similar feeding device, into a first activator zone 3. A modification agent MA in liquid form is fed by a dosing device 5, for example a sprayer, from a reservoir 4 into the first activator zone 3 in a controlled dose and at a controlled temperature.

The first activator zone 3 is provided with a heating means (not shown) maintaining the first activator zone at a temperature of 100-160° C. The first activator zone 3 has been purged with a gas atmosphere, such as nitrogen, introduced through a conduct 6 from a nitrogen source 7, whereby oxygen and humidity have been removed from the zone. After removal of oxygen and humidity, continued introduction of the gas atmosphere maintains a pressure in the first activator zone at or slightly above ambient atmospheric pressure, such as 0-50 kPa above the ambient atmospheric pressure (100-150 kPa absolute ≈0-50 kPa gauge).

The dose of the modification agent MA is controlled so as to ensure the desired ratio between the reactive —OH groups of the lignocellulosic material LC and the modification agent MA. Further, the temperature of the introduced modification agent MA is controlled so as to generate a vapour of the modification agent in the first activator zone 3. Thus, when equilibrium has been obtained the free space in the first activator zone 3 contains a gas atmosphere having a certain content of modification agent vapour (MA-vapour).

The lignocellulosic material LC is introduced from ambient conditions at the ambient temperature into the first activator zone. Thus, the MA-vapour provided in the first activator zone will easily condense on and/or be absorbed in the lignocellulosic material LC. Preferably the temperature of the introduced lignocellulosic material should be close to or better below the dew-point temperature of the MA-vapour. This facilitates condensation and absorption on the outside and inside surfaces of the porous lignocellulosic material by the contact between the MA-vapour and the lignocellulosic material. At the bottom of the first activator zone 3 is a drain 8.

After treatment with the modification agent MA in the first activator zone the lignocellulosic material LC is transported to a second reactor zone 9. The second reactor zone 9 is provided with a heating means (not shown) for heating to a temperature of 120-190° C. in a gas atmosphere maintaining a pressure in the second reactor zone at or slightly above ambient atmospheric pressure, such as 0-50 kPa gauge. In practice the two zones 3 and 9 are connected so that the purging gas atmosphere flows from the source 7 through the first and second zones 3 via a conduct 10 to the second reactor zone 9 and back to the source 7 via a conduct 11 after removal of oxygen, water and by-products in a scrubber 12. If necessary, supplementary gas may be introduced from the source 7 directly to the second reactor zone 9 via a conduct 13. Other ways are possible, but it is important that especially the gas atmosphere in the first activator zone is kept sufficiently clean of water, oxygen and hydrated acid. At the bottom of the second reactor zone 9 is a drain 14.

The first and second zones 3 and 9 are heated with heating means (not shown). The heating means may be any conventional heating means such as oil heated or electrically heated mantel. Microwave heating is also contemplated.

After treatment in the second reactor zone 9 the lignocellulosic material LC is trans-ported to a stripper zone 15, wherein it is stripped with steam or water $H_2O$. In the bottom the stripper zone 15 is connected to a condenser 16 with drain 17.

After the stripping the chips and/or flakes of modified lignocellulosic material is removed from the stripper zone 15 to further processing 18.

In one embodiment, usable in case of chips and/or flakes intended to preparation of MDF or filtration fibre, the material is stripped with steam at a temperature about 100° C. such as 100° C. to 110° C. The stripper zone 15 is in this embodiment also a defibrator. Thus this stripper/defibrator removes excess of modification agent and by-products from the material and at the same time defibrates the material. Conventional preparation of MDF starts with disintegration or defibration of lignocellulosic material. Accordingly, the defibrated material leaving the stripper zone 15 may be further processed in conventional way to obtain MDF. See for example WO 2008/030172 (Metso Panelboard AB).

It is also possible to subject the modified fibre material leaving the stripper/defibrator zone 15 to a pH adjusting treatment to generate carboxylate anions on the pending groups formed by modification with a dicarboxylic anhydride. This treatment is described in example 6 of U.S. Pat. No. 7,413,662 (Eriksen et al.) and make it possible to obtain modified fibres usable as sorptive substrates in devices such as loose mats, filter cartridges, sorptive booms, filter units and the like, in which the fibre is the active sorbant for an oil or other organic contaminant of water, or as an ion exchange material or as a combined cation exchanger and oil sorbant.

In case of lignocellulosic material for use in preparation of MDF or filtration fibre the starting material is typically chips having dimensions of 1-4 cm×1-2 cm×0.2-1 cm or flakes having dimensions of 5-10 cm×1-2 cm×0.5-1 or 2 mm. After defibration the obtained fibre typically has a length about 4 mm and a thickness (diameter) of 0.02-0.04 mm. All of these values are average values.

In another embodiment the material is stripped with steam in a stripper without defibration means. After an optional drying this material may be further processed in conventional way to prepare oriented strand boards (OSB) or chip boards.

For preparation of chip boards the average size of the chips may vary above or below the above values depending on the source.

The transportation of the lignocellulosic material through the first and second zones should be carried out in a closed transportation system using conventional transportation means selected with appropriate regard to the physical form of the lignocellulosic material. Usable transportation means includes screw conveyors, belt conveyors and transport rolls.

A further embodiment of the inventive process and apparatus suitable for the preparation of modified veneers, sheets or plates is illustrated on FIG. 2. A wood veneer, sheet or plate 101 is moved by a transportation means 123, such as a belt conveyor or transport rolls, through a sluice or air lock 119 into a first activator zone 103, then through a sluice or air lock 120 into a second reactor zone 109, thereafter through a sluice or air lock 121 into a stripper 115 zone and finally out through a sluice or air lock 122.

Similar to the embodiment shown on FIG. 1, a modification agent MA in liquid form is fed by a dosing device 105, for example a sprayer, from a reservoir 104 into the first activator zone 103 in a controlled dose and at a controlled temperature. It is contemplated to introduce the modification agent from a number of sprayers, for example from both sides of the material to be modified and/or from several locations along the material in the first activator zone 103.

Similar to FIG. 1 the first activator zone 103 is provided with a heating means (not shown) maintaining a temperature of 100-160° C. A gas atmosphere, such as nitrogen, is introduced through a conduct 106 from a nitrogen source 107, removing any oxygen and humidity and maintaining a pressure at or slightly above ambient atmospheric pressure, such as 0-50 kPa gauge. The dose and temperature of the modification agent MA is controlled so as to ensure the desired ratio between the reactive —OH groups and MA generated as MA-vapour. The veneer, sheet or plate of lignocellulosic material is introduced into the first activator zone from ambient conditions at the ambient temperature, preferably a temperature below the dew-point temperature of the MA-vapour in the first activator zone. The MP-vapour condenses on and/or is absorbed in the outer surfaces as well as the inner surfaces of the pores in the veneer, sheet or plate of lignocellulosic material. At the bottom of the first activator zone 103 is a drain 108.

From the first activator zone 103 the veneer, sheet or plate is transported through the sluice or air lock 120 into to the second reactor zone 109. The second reactor zone 109 is provided with a heating means (not shown) heating at a temperature of 120-190° C. in a gas atmosphere maintaining a pressure in the second reactor zone at or slightly above ambient atmospheric pressure, such as 0-50 kPa gauge. Some gas may be entrained through the sluice or air lock, but normally it is necessary to introduce supplementary gas from the source 107 directly to the second reactor zone 109 via a conduct 113. The gas leaves the second reactor zone 109 and flows back to the source 107 via a conduct 111 after removal of oxygen, water and by-products in a scrubber 112. At the bottom of the second reactor zone 109 is a drain 114.

The first and second zones 103 and 109 are heated with heating means (not shown). The heating means may be any conventional heating means such as oil heated or electrically heated mantel. Microwave heating is also contemplated.

From the second reactor zone 109 the veneer, sheet or plate is transported through the sluice or air lock 121 into to the stripper zone 115, wherein it is stripped with steam or water $H_2O$. In the bottom the stripper zone 115 is connected to a condenser 116 with drain 117.

After the stripping the veneer, sheet or plate is removed from the stripper zone 115 through the sluice or air lock 122 to further processing in a conventional plant 118 for preparation of veneer, sheet or plate products.

The transportation means 123, may be any suitable conveyor, preferably a belt conveyor or transport rolls. Preferably the conveyor is designed to minimize hindrance of the access of the MA-vapour to both surfaces of the veneer, sheet or plate. Thus the belt of the belt conveyor may have openings or may be in form of a net. In case of transport rolls a sufficient space between adjacent rolls is required.

Several features are found to be important for a successful modification of lignocellulosic materials. The reactive lignocellulosic hydroxyl groups (—OH) are located on the internal surfaces of pores and capillary channels in the lignocellulose. For a successful modification the modification agent must migrate into these pores and channels, react with a hydroxyl group binding—in case of a monocarboxylic anhydride—one moiety through the oxygen of a hydroxyl group to the lignocellulose molecule, releasing as a by-product the other moiety bound to the hydrogen from the hydroxyl group and finally this by-product must migrate out of the modified lignocellulose. In case of a cyclic dicarboxylic anhydride only unreacted excess of the modification agent is released.

When the modification agent is a monocarboxylic anhydride such as acetic anhydride the hydroxyl group of the lignocellulose is acetylated forming acetic acid as by-product:

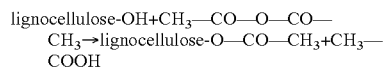

lignocellulose-OH+CH$_3$—CO—O—CO—CH$_3$→lignocellulose-O—CO—CH$_3$+CH$_3$—COOH

When the modification agent is a dicarboxylic anhydride such as maleic anhydride the hydroxyl group —O—H in lignocellulose-O—H leaves its hydrogen to form a pending carboxyl group after ring opening of maleic anhydride, whereas the carbon atom of the other carbonyl group of maleic anhydride is bound to the group —O— in lignocellulose-O—forming an ester. Accordingly, this reaction does not release any by-product:

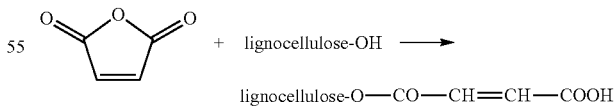

+ lignocellulose-OH ⟶ lignocellulose-O—CO—CH=CH—COOH

The water content of lignocellulosic materials such as wood is typically 16-20% by weight. To ensure an efficient migration of the modification agent into the pores and channels it is preferred to remove a major portion of the water content prior to the introduction into the first activator zone. Thus, the lignocellulosic material may be dried to a water content of 2-10% by weight, preferably 3-7% by weight, more preferred 4-6% by weight such as about 5% by weight.

Drying to a water content below 2% by weight can lead to deterioration of the structure, whereas water contents above 10% by weight can inhibit the modification agent migration.

The ratio between the lignocellulosic material and the modification agent is an important feature. When the purpose of the modification is to improve dimensional stability and resistance to biological attack, a sufficient portion of the reactive hydroxyl groups should be modified. According to general experience in case of acetylation this requires a degree of modification corresponding to a weight gain of at least 16% by weight based on a dried lignocellulosic material with a water content of 5% by weight.

In most cases the preferred weight gain is 17-25% by weight, more preferred 19-22% by weight.

It was found, that suitable results were obtained when the modification agent, exemplified as acetic anhydride, was added to the first activator zone in an amount close to or a little above the stoichiometric amount relative to the reactive hydroxyl groups to be modified. With the assumption that only one of the acetic acid moieties is bound to the lignocellulose molecule, whereas the other is released as acetic acid a weight gain of about 20% by weight requires stoichiometrically about 40% by weight of acetic anhydride, that is 40 g acetic acid per 100 g lignocellulosic material. The optimal amount can easily be estimated by a skilled person by simple trial-and-error experiments. At present it is believed that the optimal amount is from 0.9 to 2.0, preferably 0.95 to 1.5, more preferred 1.0 to 1.3 or 1.05 to 1.2 such as about 1.1 of the stoichiometric amount. In this way the total amount of excess of unreacted acetic anhydride and released acetic acid is kept on the necessary minimum.

In case the modification agent is a dicarboxylic anhydride the calculation of the stoichiometric amount is to be made as for a pure addition. Thus a weight gain of 20% requires 20 g of the dicarboxylic anhydride per 100 g lignocellulosic material. Also in case of dicarboxylic anhydride, the optimal amount can easily be estimated by a skilled person by simple trial-and-error experiments. In the same way, it is believed that the optimal amount is from 0.9 to 2.0, preferably 0.95 to 1.5, more preferred 1.0 to 1.3 or 1.05 to 1.2 such as about 1.1 of the stoichiometric amount. In this way, the amount of excess of unreacted dicarboxylic anhydride is kept on the necessary minimum.

As discussed above, it is believed that the accurate dose ratio between the lignocellulosic material and the modification agent is very important for a successful result, especially when working in industrial scale. In the examples below, the conditions in laboratory scale were designed to simulate industrial scale as far as possible. In examples 1, 2 and 5 the stoichiometric amount of acetic anhydride was 1.25 and in examples 3 and 5 the stoichiometric amount of maleic anhydride was 1.5. It is believed that an amount closer to stoichiometric amount will be more optimal in industrial scale.

Another very important feature is the prevailing conditions in the first activator zone, when the cold lignocellulosic material is introduced into the atmosphere of MA-vapour in a gas.

The MA-vapour is provided by feeding the modification agent in liquid form into the first activator zone, wherein it vaporizes almost instantly. Preferably, the amount of MA-vapour (the partial pressure thereof) should be sufficient to give a dew-point of the vapour in the gas atmosphere close to or below the temperature of the lignocellulosic material introduced from outside. In this way, the MA-vapour will condense as MA-dew on the outer and inner surfaces of the lignocellulosic material and/or is easily absorbed. This is believed to ensure an efficient access of the modification agent to the reactive hydroxyl groups.

In case of acetic anhydride, which is a liquid at ambient temperature (15-25° C.), it is not necessary to heat the acetic anhydride at the start of the process in the first activator zone. Apparently, it is possible to create acetic anhydride vapour or mist ensuring a proper contact between the lignocellulosic material and its hydroxyl groups and the acetic anhydride. However, especially when the process is carried out continuously, the temperature in the first activator zone is maintained at 100-160° C. Under such conditions a vapour of acetic anhydride above ambient temperature should be easy to establish.

In case of maleic anhydride having its melting point at 52.8° C. heating to at least about 80° C. is necessary before it can be fed into the first activator zone providing a vapour, which are able to condense on and/or be absorbed in the lignocellulosic material.

Furthermore, the amount of carboxylic acid in its hydrated form, such as acetic acid, should be kept at a low level in the modification agent added to the first activator zone, preferably far below the 5% by weight as exemplified in WO 96/19526 (Nelson et al. III). The boiling points of acetic anhydride and acetic acid are 139.8° C. and 118.1° C., respectively. This indicates that the ratio of the acid to the anhydride in the condensed dew and/or the absorbed matter will be larger than the ratio in the vapours. Thus the amount of hydrated acid should be kept as closed to zero as possible.

Accordingly, the modification agent introduced into the first activator zone has preferably a content of hydrated acids below 5% by weight, more preferred below 3% by weight or 2% by weight even more preferred below 1% by weight and in fact most preferred as low as possible such as 0% by weight.

During the activation in the first zone, it is believed that the major process is the migration of acid anhydride through the pores and channels to the site of the reactive hydroxyl groups. Contrary to the teaching of the prior art, it is believed that the hydrated carboxylic acid should be considered to have the role of a by-product, which together with any remaining water is a hindrance or resistance for the migration to the hydroxyl groups.

According to the experience of the inventors, an efficient modification is ensured when the lignocellulosic material is treated under the above mentioned conditions with about stoichiometric amounts of the anhydride substantially free of the hydrated acid, under nitrogen purging at about or a little over atmospheric pressure and at 120° C. in a period of 10-20 min. for example in 15 min. even in case the lignocellulosic material is a board of wood having a thickness of up to 30 or 50 mm.

In the second reactor zone the nitrogen pressure is maintained, and the temperature is raised to 120-190° C., in case of acetylation preferably at least 145° C. and in case of maleinylation at least 165° C. When other modification agents are used, the optimal temperature may be estimated by simple experimentation. In the reactor zone it is believed that the major processes are the esterification reaction between the hydroxyl groups and the modification agent, which is already situated near the site of a hydroxyl group and the following migration of the by-products out of the lignocellulosic material from the site through the channels and pores.

Contrarily to the prior art, neither acid anhydride nor hydrated acid is added at this stage. Again, this would probably be a hindrance or resistance for the migration and would not increase the resulting degree of esterification.

Like the activation in the first zone, the reaction time in the second zone is rather short. For example the reaction under the above conditions may be carried out in 10-20 min., for example in 15 min.

To remove remaining excess of modification agent and by-products the modified lignocellulosic material is stripped with steam in the stripper. The temperature of the steam is not critical. Usually it is from 100 to 120° C. In fact it is believed that washing in water would be sufficient to remove the remaining chemicals, which have a bad odour. Of course, such washing with water would take more time. In case some of the by-products form occluding solids, for example maleic acid formed by hydration of excessive maleic anhydride, the use of steam in the stripper is probably necessary.

Compared with the prior art processes, the present process appears to be faster, more efficient and without the bad odour found by products treated according to the prior art. Such products have often been treated in longer time and with excessive amounts of acid anhydride leading to substantial amounts of the hydrated acid. As already mentioned above, the inventors have experimented with the prior art processes and found that the modification was not efficient, probably because the modification agent did not reach the sites of the hydroxyl groups and could be washed out again by stripping. This is not the case by the present inventive process, by which the modified groups resist an efficient steam stripping.

Furthermore, the present process and apparatus are more simple and the process is easier to control as long as the relevant parameters—as indicated above—are kept within the proper ranges either mentioned in the present application or easily found by routine experiments.

The modified lignocellulosic material leaving the stripper is in a condition for further processing depending on the intended end use of the product. Possible end products include fibre boards, such as MDF (medium density fibreboards) and OSB (oriented strand boards) and similar board standards, filtration fibres, for example the sorptive fibre materials disclosed in the above mentioned U.S. Pat. No. 7,413,662 (Eriksen et al.), veneer products and other products based on lignocellulosic materials in fibre, chip, shred, veneer, board or plate form.

The modification agent may in principle be selected among any mono- and dicarboxylic anhydride and mixtures thereof, which may be introduced into the first activator zone under formation of a vapour in the gas atmosphere. From this vapour the agent easily will condense on and/or will be absorbed by the lignocellulosic material. Preferably, the vapour should have its dew point below the temperature of the introduced lignocellulosic material, which in practise is kept at ambient temperature before the treatment.

Suitable acid anhydrides includes, but are not limited to monocarboxylic anhydrides such as acetic anhydride, propanoic anhydride, butanoic anhydride, and dicarboxylic anhydrides such as maleic anhydride, succinic anhydride and phthalic anhydride.

As appears from the above disclosure, it is very important that the conditions in the first activator zone is maintained and controlled under the inventive process. The basic atmosphere can be maintained as an inert atmosphere, which necessitate continuous introduction of an inert gas, such as nitrogen. This may give a slight elevation of the pressure, but to avoid escape of contaminating and/or malodorous compounds the pressure should be kept as close to the ambient pressure as possible. In practice the level is 0-50 kPag.

Furthermore, the temperature and the introduction of the modification agent should be controlled in such a way that a suitable vapour is generated, which vapour should tend to condense on and/or be absorbed in the lignocellulosic material easily. In each case the optimal temperature and concentration of the vapour depend on the selected modification agent and may be estimated by simple trail-and-error experiments.

Finally, the introduction of the lignocellulosic material to be modified should be controlled to obtain a suitable ratio between the lignocellulosic material and the modification agent, which ratio as stated above should be so that the dose of modification agent introduced into the first activator zone is 0.9 to 2.0 of the stoichiometric amount of the modification agent calculated on the basis of the reactive hydroxyl groups to be modified in the lignocellulosic material.

To ensure a proper control of the process—to be carried out continuously with the lignocellulosic material moving continuously through the zones—the pressure and temperature will be maintained at the elected level, and depending thereof the introduction rate of the lignocellulosic material, the feeding rate and temperature of the modification agent are all controlled by a common computer system. In case of a batchwise process, similar calculations are required.

In case of maleic anhydride the dose of modification agent introduced into the first activator zone is typically 15-25 gram per 100 gram of the lignocellulosic material. In case of acetic anhydride it is typically 30-50 gram per 100 gram of the lignocellulosic material.

Depending on the actual modification agent, the temperature in the first activator zone is typically selected to 100-160° C., preferably 110-150° C. Thus in case of acetic anhydride it is preferably 110-130° C., more preferred 115-125° C. In case of maleic anhydride (melting point 52.8° C.) it is preferably 130-150° C., more preferred 135-145° C. In case of modification agents having a higher melting point higher temperatures such as 180° C. or even higher might be suitable.

In the second reactor zone the basic atmosphere should be maintained as a atmosphere, which again necessitate continuous introduction of a gas giving a slight elevation of the pressure. Again the pressure should be kept as close as possible to the ambient pressure to avoid escape of contaminating and/or malodorous compounds.

The temperature selected for the second reactor zone should be sufficient to support the reaction, and on the other hand below temperatures leading to deterioration of the lignocellulosic material.

Depending on the actual modification agent the temperature in the second reactor zone is typically selected to 120-190° C., preferably 130-180° C. Thus in case of acetic anhydride it is preferably 130-150° C., more preferred 135-145° C. In case of maleic anhydride it is preferably 140-185° C., more preferred 145-170° C.

EXAMPLES

Example 1

Laboratory experiments were carried out to simulate the activation in the first activator zone.

5 g acetic anhydride was added to a 500 ml rotary flask with heating mantle. Then 10 g cold (ambient temperature) lignocellulosic fibre (average: length about 4 mm and a thickness (diameter) of 0.02-0.04 mm) was added to the flask and the sample was rapidly heated to about 120° C. and the temperature was maintained in 20-25 minutes under moderate rotation.

The sample was stripped conventionally with isopropyl alcohol (IPA) and dried in an oven over night. 5 test runs gave weight gains from 8 to 12% by weight with an average of 10% by weight. Thus, about 50% of the modification agent (acetic anhydride) was reacted with the lignocellulosic hydroxyl groups, whereas the acetic acid formed as by product and unreacted acetic anhydride were removed by the IPA-stripping.

The experiment was repeated with chips for MDF (average: 1-4 cm×1-2 cm×0.2-1 cm) with weight gains from 8 to 12% by weight.

Similar results were obtained with 125 g acetic anhydride and 250 g flakes (5-10 cm×1-2 cm×0.5-2 mm) in a 10 l flask.

Example 2

This example illustrates by laboratory experiments the inventive 2 step process combining the activation in the first activator zone with a following reaction in an oven at 135-145° C. as the second reactor zone.

In the same way as in example 1, 5 g acetic anhydride was added to a 500 ml rotary flask with heating mantle. Then 10 g cold (ambient temperature) lignocellulosic fibre was added and rapidly heated to about 120° C. and the temperature was maintained in 20-25 minutes under moderate rotation.

The sample was transferred to a pre-heated and vented oven and was heated at 135-145° C. in 20-25 minutes.

The reacted sample was stripped conventionally with isopropyl alcohol (IPA) and dried in an oven over night. 5 test runs gave weight gains from 18 to 22% by weight with an average of 20% by weight. Thus, this 2 step modification appears to be very effective as almost all of the modification agent (acetic anhydride) had reacted with the lignocellulosic hydroxyl groups. Thus, the acetic anhydride present in the capillary channels and pores but not yet reacted at the end of the first activator step was reacted with the hydroxyl groups during the second reactor step and was not removed by the stripping.

The experiment was repeated with chips for MDF with weight gains from 18 to 22% by weight and average 20% by weight.

In this way about 4.5 kg flakes for experiments with OSB preparation was obtained with an average weight gain of 19.5% by weight.

Example 3

This example illustrates modification with a dicarboxylic anhydride. Maleic anhydride has to be heated to above its melting point at 52° C. before the activation.

3 g maleic anhydride was added to a 500 ml rotary flask with heating mantle and was heated to 80° C. under rotation. Then 10 g cold (ambient temperature) lignocellulosic fibre was added to the flask and the sample was heated at about 140° C. in 20-25 minutes under continued rotation.

The sample was transferred to a pre-heated and vented oven and was heated at 145-165° C. in 20-25 minutes.

The reacted sample was stripped conventionally with isopropyl alcohol (IPA) and dried in an oven over night. 5 test runs gave weight gains from 18 to 22% by weight with an average of 20% by weight. This example shows that an effective modification by the present 2 step process also is obtainable when the modification agent is a dicarboxylic anhydride as almost all of the modification agent (maleic anhydride) had reacted with the lignocellulosic hydroxyl groups.

Similar results, 18-22% weight gain with 20% average, was obtained with chips for MDF production.

Example 4

This example illustrate double modification with both mono- and di-carboxylic anhydride for preparation of sorptive fibre as disclosed in U.S. Pat. No. 7,413,662 (Eriksen et al.).

5 g acetic anhydride and 3 g maleic anhydride was added to a 500 ml rotary flask with heating mantle and was heated to 80° C. under rotation. Then 10 g cold (ambient temperature) lignocellulosic fibre was added to the flask and the sample was heated at about 140° C. in 20-25 minutes under continued rotation The sample was transferred to a pre-heated and vented oven and was heated at 145-165° C. in 20-25 minutes and finally stripped as in the previous examples. The resulting weight gain was 3.6 g=36% by weight, based on the total of acetylation and maleylation.

Similar results were obtained with chips.

Example 5

The test runs according to examples 1-4 were repeated with steam stripping in stead of IPA-stripping. Steam at about 100° C. was generated in a kettle and transferred via a tube to the reaction flask. After stripping for a few seconds the condensed water was removed by filtration and the samples were dried in a vented oven over the night and weighed. The efficiency of this steam stripping was the same as for the IPA-stripping.

Stripping with warm and cold water gave similar results with acetic anhydride as the modification agent. However, in case a too large excess of maleic anhydride has been used crystallization of maleic acid may occur.

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

The invention claimed is:

1. A process for the preparation of a modified lignocellulosic material by contacting and reacting a lignocellulosic material with a modification agent, which contains acid anhydride, and stripping the modified lignocellulosic material to remove excess of modification agent and by-products, including the steps of
    a) introduction of the lignocellulosic material into a first activator zone and treatment of the lignocellulosic material in the first activator zone having an atmosphere of the modification agent, which contains one or more acid anhydrides, in vapour form in a gas at a gauge pressure of 0-50 kPag and a temperature of 100-160° C.,
    b) transfer of the lignocellulosic material from the first activator zone into a second reactor zone and treatment of the lignocellulosic material in the second reactor zone having an atmosphere of a gas at a gauge pressure of 0-50 kPag and a temperature of 120-190° C.,
    c) transfer of the lignocellulosic material from the second reactor zone into a stripper zone and stripping of the lignocellulosic material with steam or water in the stripper zone,
    d) optionally transfer to further processing,
    wherein the modification agent introduced into the first activator zone has a content of hydrated acids below 3% by weight.

2. A process according to claim 1, wherein the lignocellulosic material comprises wood chips.

3. A process according to claim 2, wherein the lignocellulosic material consists of wood chips.

4. A process according to claim 1, wherein the atmosphere of the modification agent, which contains one or more acid anhydrides, in vapour form in the gas at a gauge pressure of 0-50 kPag and a temperature of 100-160° C. in the first activator zone is maintained by control of a heating means, gas introduction and dosed introduction of modification agent.

5. A process according to claim 1, wherein the dose of modification agent introduced into the first activator zone is 0.9 to 2.0 of the stoichiometric amount of the modification agent calculated on the basis of the reactive hydroxyl groups to be modified in the lignocellulosic material.

6. A process according to claim 1, wherein the vapour of modification agent is generated by spraying the modification agent in liquid form into the first activator zone.

7. A process according to claim 1, wherein the lignocellulosic material prior to being introduced into the first activator zone has a temperature below the dew point of the vapour of the modification agent.

8. A process according to claim 1, wherein the lignocellulosic material introduced into the first zone has been dried to a water content below 7% by weight.

9. A process according to claim 1, wherein the lignocellulosic material is treated in the first activator zone for 5-30 minutes.

10. A process according to claim 1, wherein the lignocellulosic material is treated in the second reactor zone for 5-30 minutes.

11. A process according to claim 1, wherein the process is continuous and wherein the lignocellulosic material is moved continuously through the first activator zone, the second reactor zone and the stripper zone.

12. A process according to claim 1, wherein the lignocellulosic material is moved batch-wise into the first activator zone, then to the second reactor zone and finally to the stripper zone.

13. A process according to claim 1, wherein the lignocellulosic material in step c) is stripped with steam having a temperature of 100-150° C.

14. A process according to claim 1, wherein the resulting modified lignocellulosic material is increased in weight by 16-22% as compared to the original, dried lignocellulosic material introduced in the first activator zone.

15. A process according to claim 1, wherein the lignocellulosic material comprises wood chips or larger wooden items.

* * * * *